United States Patent
Sharma et al.

(10) Patent No.: US 11,561,405 B1
(45) Date of Patent: *Jan. 24, 2023

(54) WAVEFRONT SENSING WITH IN-FIELD ILLUMINATORS

(71) Applicant: Meta Platforms Technologies, LLC, Menlo Park, CA (US)

(72) Inventors: Robin Sharma, Redmond, WA (US); Karol Constantine Hatzilias, Kenmore, WA (US); Andrew John Ouderkirk, Redmond, WA (US); Qi Zhang, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/917,893

(22) Filed: Jun. 30, 2020

Related U.S. Application Data

(60) Provisional application No. 62/928,948, filed on Oct. 31, 2019.

(51) Int. Cl.
   *G02B 27/01* (2006.01)
   *G02B 5/20* (2006.01)
   *G06F 3/01* (2006.01)

(52) U.S. Cl.
   CPC ......... *G02B 27/0179* (2013.01); *G02B 5/208* (2013.01); *G02B 27/0172* (2013.01); *G06F 3/013* (2013.01); *G02B 2027/0105* (2013.01); *G02B 2027/0138* (2013.01); *G02B 2027/0174* (2013.01); *G02B 2027/0187* (2013.01)

(58) Field of Classification Search
   CPC ................ G02B 27/0179; G02B 5/208; G02B 27/0172; G02B 2027/0105; G02B 2027/0138; G02B 2027/0174; G02B 2027/0187; G06F 3/013
   See application file for complete search history.

(56) References Cited

U.S. PATENT DOCUMENTS

| | | | |
|---|---|---|---|
| 9,798,147 B1* | 10/2017 | Park | G03H 1/2294 |
| 10,852,551 B1* | 12/2020 | Sharma | H04N 5/2254 |
| 2013/0176536 A1* | 7/2013 | Thompson | A61B 3/103 |
| | | | 351/233 |
| 2013/0286053 A1* | 10/2013 | Fleck | G09G 5/377 |
| | | | 345/690 |
| 2016/0026253 A1* | 1/2016 | Bradski | H04N 13/167 |
| | | | 345/8 |
| 2017/0039904 A1* | 2/2017 | Jepsen | G02F 1/13306 |
| 2018/0150709 A1* | 5/2018 | Ha | H04N 5/23222 |
| 2020/0371370 A1* | 11/2020 | Ouderkirk | H04N 9/3102 |
| 2021/0041692 A1* | 2/2021 | Zhang | G01J 5/024 |

* cited by examiner

*Primary Examiner* — Dmitriy Bolotin
(74) *Attorney, Agent, or Firm* — Freestone Intellectual Property Law PLLC; Aaron J. Visbeek

(57) ABSTRACT

An eye is illuminated with infrared illumination light from an array of infrared in-field illuminators. A wavefront image of retina-reflected infrared light is generated and an accommodative eye state value is determined based at least in part on the wavefront image.

20 Claims, 13 Drawing Sheets

WAVEFRONT SENSING WITH IN-FIELD ILLUMINATORS

CROSS REFERENCE TO RELATED APPLICATIONS

This application claims priority to U.S. provisional Application No. 62/928,948 filed Oct. 31, 2019, which is hereby incorporated by reference.

BACKGROUND INFORMATION

In a variety of different optical contexts, the ability to measure or sense a light wavefront is useful. Head mounted displays (HMDs) present virtual images to users of the HMD. In some contexts, it is advantageous for the HMD to determine the location of the eye of the user and/or determine where the eyes of the user are focusing. However, conventional methods used in HMDs and other optical systems for determining where an eye is focusing can be inaccurate, especially across age demographics

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
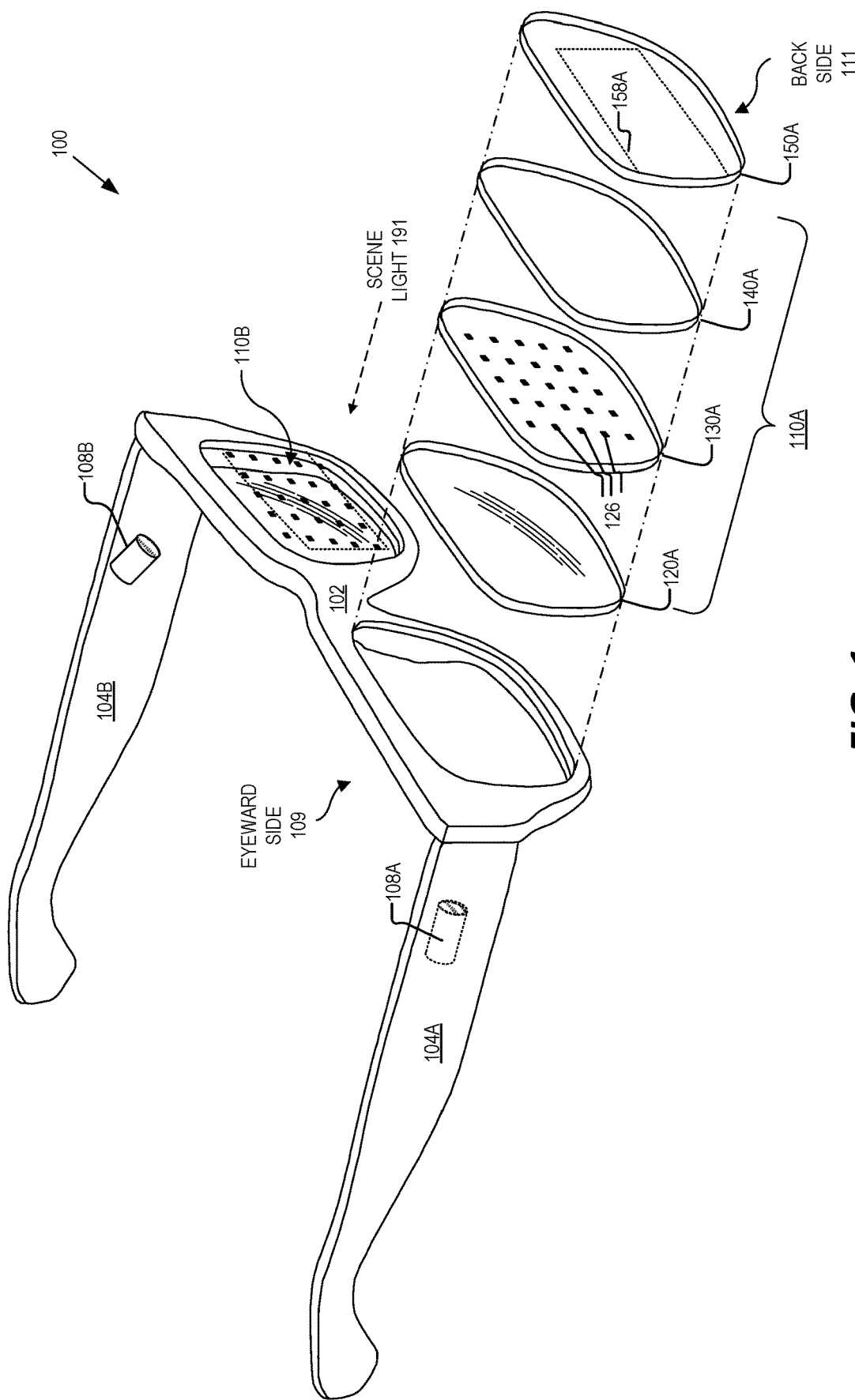
FIG. 1 illustrates an example HMD that may include infrared in-field illuminators and a combiner for redirecting retina-reflected infrared light to a wavefront sensor, in accordance with aspects of the disclosure.

Embodiments of wavefront sensing with in-field illuminators are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of an apparatus, system, and method for wavefront sensing described in this disclosure are capable of capturing a wavefront image of infrared light propagating through the lens of an eye. By determining the converging or diverging attributes of the wavefront, an accommodative state of the eye can be determined. Conventionally, Vergence-Accommodation Conflict (VAC) is used as a surrogate to approximate the accommodative state of the eye. For example, when two eyes are narrowed the eyes are likely focused to a near-field object (e.g. a book held close) whereas two eyes that are looking straight ahead are likely focused near infinity (e.g. a mountain in the distance). However, VAC only approximates the accommodative state of the eye. Furthermore, the accommodative response of the eye varies over different age groups. For example, individuals under approximately age 45 may accommodate freely while older individuals may have limited accommodation response. For these reasons, it would be advantageous to measure an accommodative state of the eye rather than approximating the accommodative state based on vergence.

Embodiments of the disclosure provide a way to measure an accommodative state of the eye in real time or pseudo real-time. To determine the accommodative state of the eye, an infrared wavefront that has propagated through the lens of the eye is measured by a wavefront sensor. A wavefront image captured by wavefront sensor is analyzed for divergence or convergence to determine the accommodative state of the eye and a virtual image presented to the eye(s) may be adjusted based on the determined accommodative state of the eye. An array of infrared in-field illuminators or a photonic integrated circuit (PIC), for example, may illuminate the eye with infrared illumination light and a combiner is utilized to redirect an infrared wavefront (that propagated through the eye lens and is exiting the pupil) to the wavefront sensor. The infrared in-field illuminators may be configured to emit infrared illumination light that is collimated or near-collimated to a center of rotation of an eye. These and other embodiments are described in more detail in connections with FIGS. 1-11.

FIG. 1 illustrates an example HMD 100, in accordance with aspects of the present disclosure. The illustrated example of HMD 100 is shown as including a frame 102, temple arms 104A and 104B, and near-eye optical elements 110A and 110B. Wavefront sensors 108A and 108B are shown as coupled to temple arms 104A and 104B, respectively. FIG. 1 also illustrates an exploded view of an example of near-eye optical element 110A. Near-eye optical element 110A is shown as including an optically transparent layer 120A, an illumination layer 130A, an optical combiner layer 140A, and a display layer 150A. Display layer 150A may include a waveguide 158 that is configured to direct virtual images to an eye of a user of HMD 100.

Illumination layer 130A is shown as including a plurality of in-field illuminators 126. In-field illuminators 126 are described as "in-field" because they are in a field of view (FOV) of a user of the HMD 100. In-field illuminators 126 may be in a same FOV that a user views a display of the HMD, in an embodiment. In-field illuminators 126 may be in a same FOV that a user views an external environment of the HMD 100 via scene light 191 propagating through near-eye optical elements 110. While in-field illuminators 126 may introduce minor occlusions into the near-eye optical element 110A, the in-field illuminators 126, as well as their corresponding electrical routing may be so small as to be unnoticeable or insignificant to a wearer of HMD 100. Additionally, any occlusion from in-field illuminators 126 will be placed so close to the eye as to be unfocusable by the human eye and therefore assist in the in-field illuminators 126 being not noticeable or insignificant. In some embodiments, each in-field illuminator 126 has a footprint (or size) that is less than about 200×200 microns. When HMD 100 is being worn by a user, the in-field illuminators 126 may be disposed between 10 mm and 30 mm from the eye. In some embodiments, the in-field illuminators 126 may be placed between 15 mm and 25 mm from the eye of a user. The in-field illuminators 126 may be infrared in-field illuminators 126 configured to emit infrared illumination light for eye-tracking purposes, for example.

In some embodiments (not illustrated), a photonic integrated circuit (PIC) may be implemented instead of in-field illuminators 126 to achieve a similar function as in-field illuminators 126. For example, outcoupling elements may be positioned similarly to the infield-illuminators 126 and the outcoupling elements may be provided infrared light by transparent waveguides. Light sources located at the edge of a frame of the HMD may provide the infrared light into the transparent waveguides, for example. The outcoupling elements then redirect the infrared light provided by the waveguides to illuminate an eyeward region. The outcoupling elements may have diffractive or refractive features to facilitate beam-shaping of the infrared light received from the waveguides. Other techniques (not necessarily considered to be PICs) may also be implemented to achieve a similar illumination function as described with respect to in-field illuminators 126. In a VR HMD context, wavefront sensor(s) 108 of this disclosure may also be disposed in numerous places in the VR HMD besides a template position, as illustrated in FIG. 1.

As shown in FIG. 1, frame 102 is coupled to temple arms 104A and 104B for securing the HMD 100 to the head of a user. Example HMD 100 may also include supporting hardware incorporated into the frame 102 and/or temple arms 104A and 104B. The hardware of HMD 100 may include any of processing logic, wired and/or wireless data interface for sending and receiving data, graphic processors, and one or more memories for storing data and computer-executable instructions. In one example, HMD 100 may be configured to receive wired power and/or may be configured to be powered by one or more batteries. In addition, HMD 100 may be configured to receive wired and/or wireless data including video data.

FIG. 1 illustrates near-eye optical elements 110A and 110B that are configured to be mounted to the frame 102. In some examples, near-eye optical elements 110A and 110B may appear transparent to the user to facilitate augmented reality or mixed reality such that the user can view visible scene light from the environment while also receiving display light directed to their eye(s) by way of display layer 150A. In further examples, some or all of near-eye optical elements 110A and 110B may be incorporated into a virtual reality headset where the transparent nature of the near-eye optical elements 110A and 110B allows the user to view an electronic display (e.g., a liquid crystal display (LCD), an organic light emitting diode (OLED) display, a micro-LED display, etc.) incorporated in the virtual reality headset.

As shown in FIG. 1, illumination layer 130A includes a plurality of in-field illuminators 126. Each in-field illuminator 126 may be disposed on a transparent substrate and may be configured to emit light towards an eyeward side 109 of the near-eye optical element 110A. In some aspects of the disclosure, the in-field illuminators 126 are configured to emit near infrared light (e.g. 750 nm-1.5 μm). Each in-field illuminator 126 may be a micro light emitting diode (micro-LED), an edge emitting LED, a vertical cavity surface emitting laser (VCSEL) diode, or a Superluminescent diode (SLED).

As mentioned above, the in-field illuminators 126 of the illumination layer 130A may be configured to emit infrared illumination light towards the eyeward side 109 of the near-eye optical element 110A to illuminate the eye of a user. The near-eye optical element 110A is shown as including optical combiner layer 140A where the optical combiner layer 140A is disposed between the illumination layer 130A and a backside 111 of the near-eye optical element 110A. In some aspects, the optical combiner 140A is configured to receive retina-reflected infrared light that is reflected by retina of the eye of the user and to direct the retina-reflected infrared light towards the wavefront sensor 108A. The wavefront sensor(s) 108 may be located in different positions than the positions illustrated. In some aspects, the optical combiner 140A is transmissive to visible light, such as scene light 191 incident on the backside 111 of the near-eye optical element 110A. In some examples, the optical combiner 140A may be configured as a volume hologram and/or may include one or more Bragg gratings for directing the retina-reflected infrared light towards the wavefront sensor 108A. In some examples, the optical combiner 140A includes a polarization-selective volume hologram (a.k.a. polarized volume hologram) that diffracts (in reflection) a particular polarization orientation of incident light while passing other polarization orientations.

Display layer 150A may include one or more other optical elements depending on the design of the HMD 100. For example, display layer 150A may include a waveguide 158 to direct display light generated by an electronic display to the eye of the user. In some implementations, at least a portion of the electronic display is included in the frame 102 of the HMD 100. The electronic display may include an LCD, an organic light emitting diode (OLED) display, micro-LED display, pico-projector, or liquid crystal on silicon (LCOS) display for generating the display light.

Optically transparent layer 120A is shown as being disposed between the illumination layer 130A and the eyeward side 109 of the near-eye optical element 110A. The optically transparent layer 120A may receive the infrared illumination light emitted by the illumination layer 130A and pass the infrared illumination light to illuminate the eye of the user. As mentioned above, the optically transparent layer 120A may also be transparent to visible light, such as scene light 191 received from the environment and/or display light received from the display layer 150A. In some examples, the optically transparent layer 120A has a curvature for focusing light (e.g., display light and/or scene light) to the eye of the user. Thus, the optically transparent layer 120A may, in some examples, may be referred to as a lens. In some aspects, the optically transparent layer 120A has a thickness and/or curvature that corresponds to the specifications of a user. In other words, the optically transparent layer 120A may be a prescription lens. However, in other examples, the optically transparent layer 120A may be a non-prescription lens.

While FIG. 1 illustrates an HMD 100 configured for augmented reality (AR) or mixed reality (MR) contexts, the disclosed embodiments may also be used in other implementations of an HMD. For example, the illumination layers of this disclosure may be disposed close to a display plane of a display of a virtual reality (VR) or prior to a focusing lens of a VR HMD where the focusing lens is disposed between the illumination layer and the display and the focusing lens focuses display light from the display for an eye of a wearer of the VR HMD.

Figure 2:
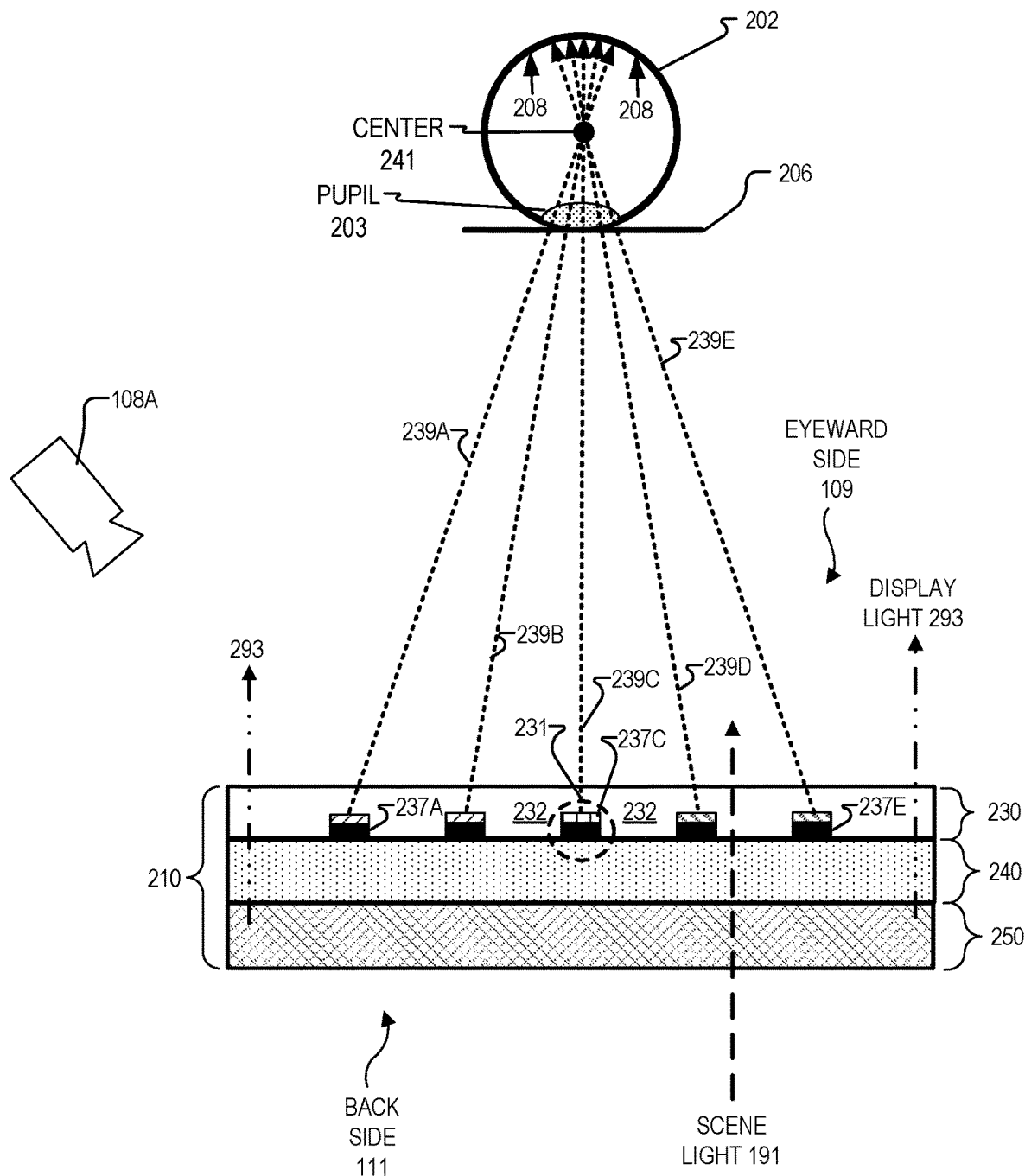
FIG. 2 is a top view of an example near-eye optical element that includes an illumination layer, a combiner layer, and a display layer, in accordance with aspects of the disclosure.

FIG. 2 is a top view of an example near-eye optical element 210 that includes an illumination layer 230, a combiner layer 240, and a display layer 250. A transparent layer (not illustrated) may optionally be included between illumination layer 230 and eye 202, in some embodiments. A plurality of infrared in-field illuminators 237 emit infrared illumination light 239 to an eyebox area to illuminate eye 202. Plane 206 illustrates a two-dimensional pupil plane 206 in the eyebox area being normal to the curvature of the eye 202 at the center of pupil 203. FIG. 2 illustrates example array of infrared in-field illuminators 237A-237E. Each infrared in-field illuminator 237 in the array is configured to emit infrared illumination light 239 to a center of rotation 241 of eye 202. The different infrared in-field illuminators 237 may direct infrared illumination light 239 to the center of rotation of eye 202 at different angles depending on the position of the infrared in-field illuminator with respect to eye 202. For example, infrared in-field illuminators 237A and 237E may include beam-forming elements that direct the infrared illumination light to eye 202 at steeper angles compared to infrared illuminator 237C directing infrared illumination light 239 to eye 202 at an angle closer to normal. The center of rotation 241 of eye 202 remains at a substantially same position with respect to illuminators 237 even over a large range of gaze angles of eye 202.

As described above, infrared in-field illuminators 237 may be VCSELs or SLEDs, and consequently infrared illumination light 239 may be narrow-band infrared illumination light (e.g. linewidth of 1-10 nm). The infrared illumination light 239 may be collimated or near-collimated so that at least a portion of the infrared illumination light 239 will propagate through pupil 203 of eye 202, reflect of off retina 208 and exit eye 202 through pupil 203 as retina-reflected infrared light. As will be described in greater detail below, the retina-reflected infrared light may be received by combiner optical element 240 and redirected to wavefront sensor 108A to generate a wavefront image. As described above, alternative illumination layer implementations that utilize outcoupling elements, waveguides, and/or planar waveguides that achieve a similar function as infrared in-field illuminators 237 may also be utilized to generate infrared illumination light 239 that is collimated or near-collimated.

Wavefront sensor 108A is configured to capture wavefront images that may be utilized to determine an accommodative eye state value of eye 202, for example. Wavefront sensor 108 may include an infrared bandpass filter to pass the wavelength of the infrared illumination light 239 emitted by the infrared illuminators and block other light from becoming incident on an image sensor of wavefront sensor 108A, in some embodiments.

FIG. 2 shows that scene light 191 (visible light) from the external environment may propagate through display layer 250, combiner layer 240, and illumination layer 230 to become incident on eye 202 so that a user can view the scene of an external environment. FIG. 2 also shows that display layer 250 may generate or redirect display light 293 to present virtual images to eye 202. Display light 293 is visible light and propagates through combiner layer 240 and illumination layer 230 to reach eye 202.

Illumination layer 230 may include a transparent substrate that the infrared in-field illuminators 237 are disposed on. The infrared in-field illuminators 237 may also be encapsulated in a transparent material 232. Transparent material 232 is configured to transmit visible light (e.g. 400 nm-750 nm) and near-infrared light (e.g. 750 nm-1.5 µm).

Figure 3:
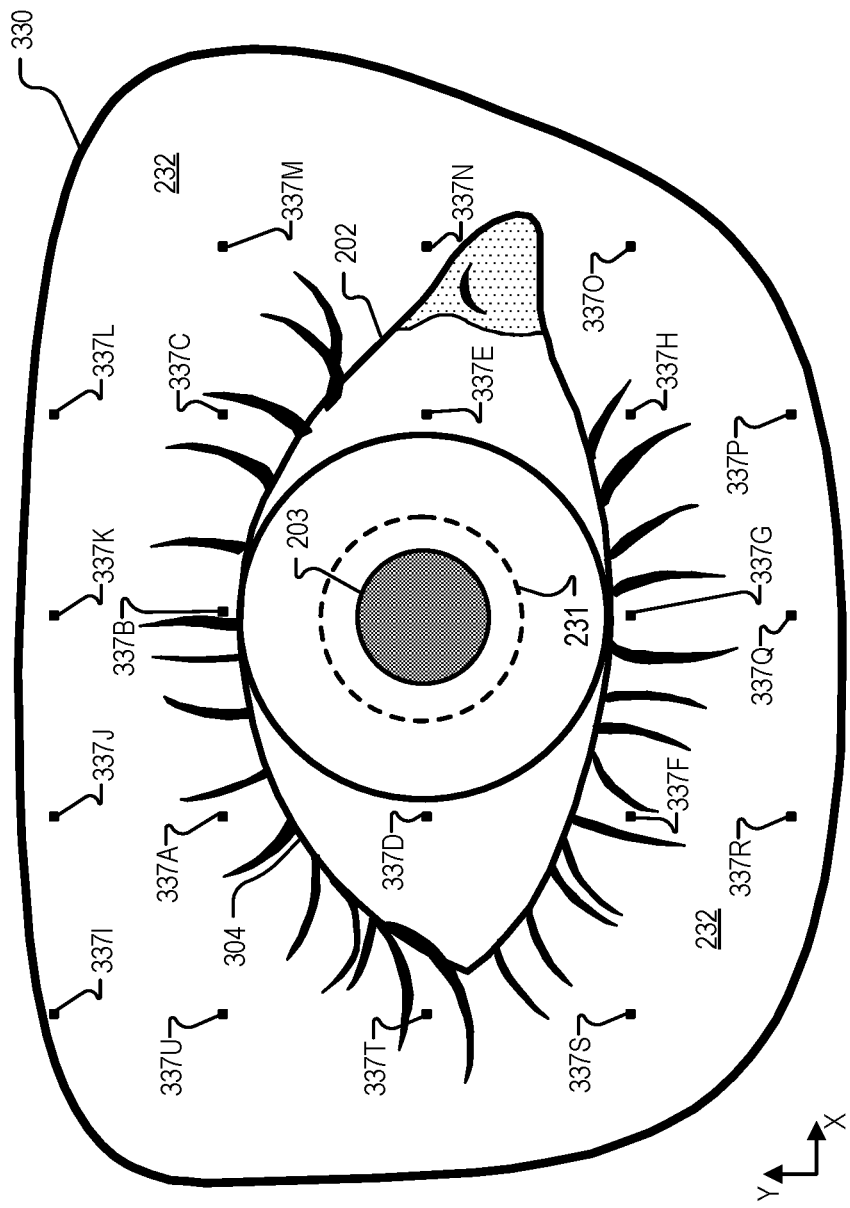
FIG. 3 illustrates a front view of an eye through an example illumination layer, in accordance with aspects of the disclosure.

FIG. 3 illustrates a front view of eye 202 through an example illumination layer 330, in accordance with aspects of the disclosure. In the illustrated embodiment, illumination layer 330 include twenty-one infrared in-field illuminators (337A-337U). In the illustrated example, infrared illuminators 337A-337H may be considered an "inner ring" of infrared in-field illuminators 337 while infrared illuminators 337I-337U are considered an "outer ring" of infrared in-field illuminators 337. As such, infrared illuminators 337I-337U may direct their infrared illumination light to eye 202 at a steeper angle than infrared illuminators 337A-337H in the inner ring. An illumination angle of the infrared illumination light 239 from different in-field infrared illuminators 337 may increase as a distance of a particular infrared in-field illuminators 337 increases from middle region 231 of the array of infrared in-field illuminators 337.

Figure 4:
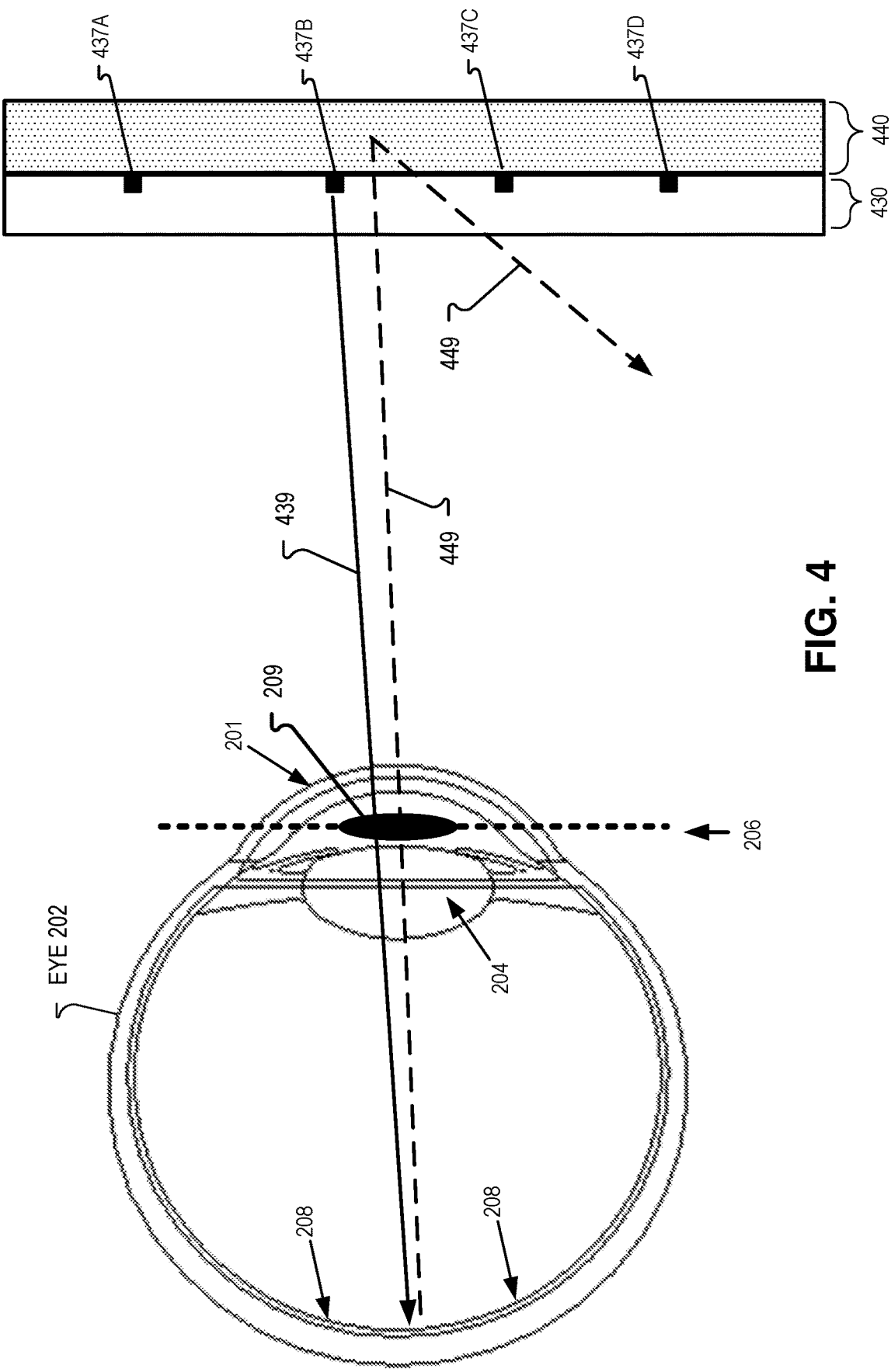
FIG. 4 illustrates an example optical path of infrared illumination light and retina-reflected infrared light, in accordance with aspects of the disclosure.

FIG. 4 illustrates an example optical path of infrared illumination light 439 and retina-reflected infrared light 449, in accordance with aspects of the disclosure. In FIG. 4, an array of infrared in-field illuminators 437 emit infrared illumination light 439 to a center of rotation of eye 202. Only the infrared illumination light from infrared in-field illuminators 437B is shown for illustration and description of the optical path of the infrared illumination light, in FIG. 4. Portions of infrared illumination light 439 (not illustrated) may not necessarily propagate through the pupil and may be scattered by the iris or cornea. However, at least a portion of infrared illumination light 439 propagates substantially normal to pupil plane 206 of eye 202 and propagates through the cornea 201, anterior chamber, pupil 209, and lens 204 of eye 202 before becoming incident upon the retina 208. A portion (e.g. ~10% for 850 nm light) of infrared illumination light 439 reflects off the retina 208 as retina-reflected infrared light 449. The portion of infrared illumination light 439 that propagates through pupil 209 normal to (or at least substantially normal to) pupil plane 206 is the light that can be reflected back out of pupil 209 after reflecting off of retina 208 rather than being absorbed by the interior of eye 202. In FIG. 4, retina-reflected infrared light 449 propagates through lens 204, pupil 209, and cornea 201 to exit eye 202. Retina-reflected infrared light 449 then propagates through illumination layer 430 and encounters combiner optical element 440.

Combiner optical element 440 receives retina-reflected infrared light 449 and redirects the retina-reflected infrared light 449 to a wavefront sensor (e.g. wavefront sensor 108). Combiner optical element 440 may include a polarization-selective volume hologram that reflects a first polarization orientation (e.g. right-hand circularly polarized light) of the retina-reflected infrared light and passes polarization orientations that are other than the first polarization orientation. Combiner optical element 440 may also include a folding mirror, hologram or linear diffractive grating, to redirected retina-reflected infrared light 449, in some embodiments. The combiner optical element 440 passes visible light.

Figure 5:
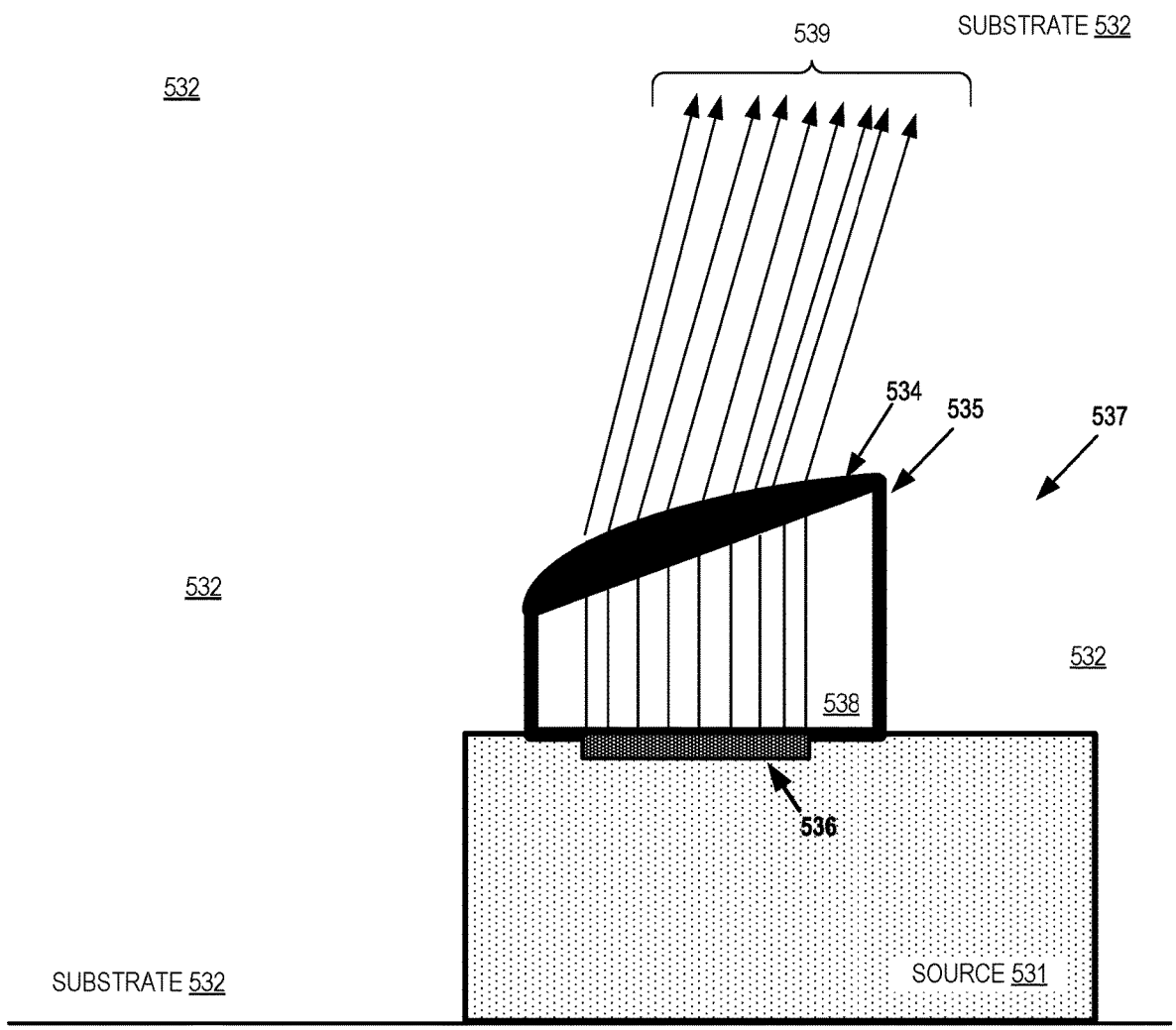
FIG. 5 illustrates an example infrared in-field illuminator including a light source and an example beam-forming element, in accordance with aspects of the disclosure.

FIG. 5 illustrates an example infrared in-field illuminator 537 that may be utilized as infrared illuminators 126/237/337/447, in accordance with aspects of the disclosure. The example infrared in-field illuminator 537 illustrated in FIG. 5 includes an infrared light source 531 having an output aperture 536 and a beam-forming element 535 disposed over output aperture 536. Beam-forming element 535 is configured to direct the infrared illumination light 539 to a center of rotation of an eye. In the illustrated embodiment of FIG. 5, beam-forming element 535 includes a refractive material 538 and a lens curvature 534 may be formed of the refractive material 538 of the beam-forming element 535. The lens curvature 534 may assist in directing the infrared illumination light 539 to a center of rotation of the eye. The beam-forming elements of the infrared light sources may be configured to increase an illumination angle of the infrared illumination light 539 as a distance of a particular beam-forming element increases from a middle region (e.g. 231) of the array of infrared in-field illuminators so that the infrared illumination light 539 from each infrared in-field illuminator 537 is directed to a center of rotation of the eye.

Substrate 532 is a transparent material. Refractive material 538 of beam-forming element 535 may be a high-index material having a refractive index of greater than three. In some embodiments, the illustrated refractive beam-forming element 535 is replaced by, or includes, a diffractive optical element configured to direct the infrared illumination light 539 to the eye. In some embodiments, beam-forming element 535 is approximately 30 microns wide.

Figure 6A:
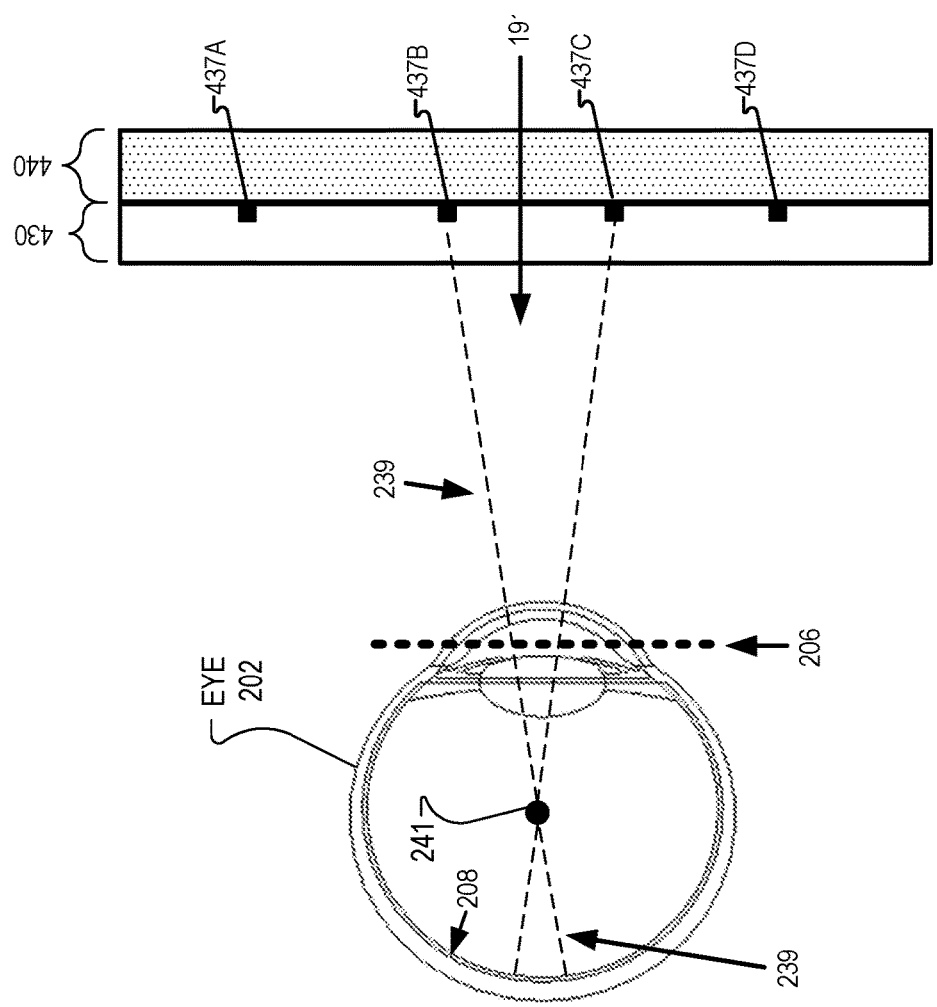
FIGS. 6A-6C illustrate an eye in different positions with respect to an array of infrared in-field illuminators and an example combiner, in accordance with aspects of the disclosure.
Figure 6B:
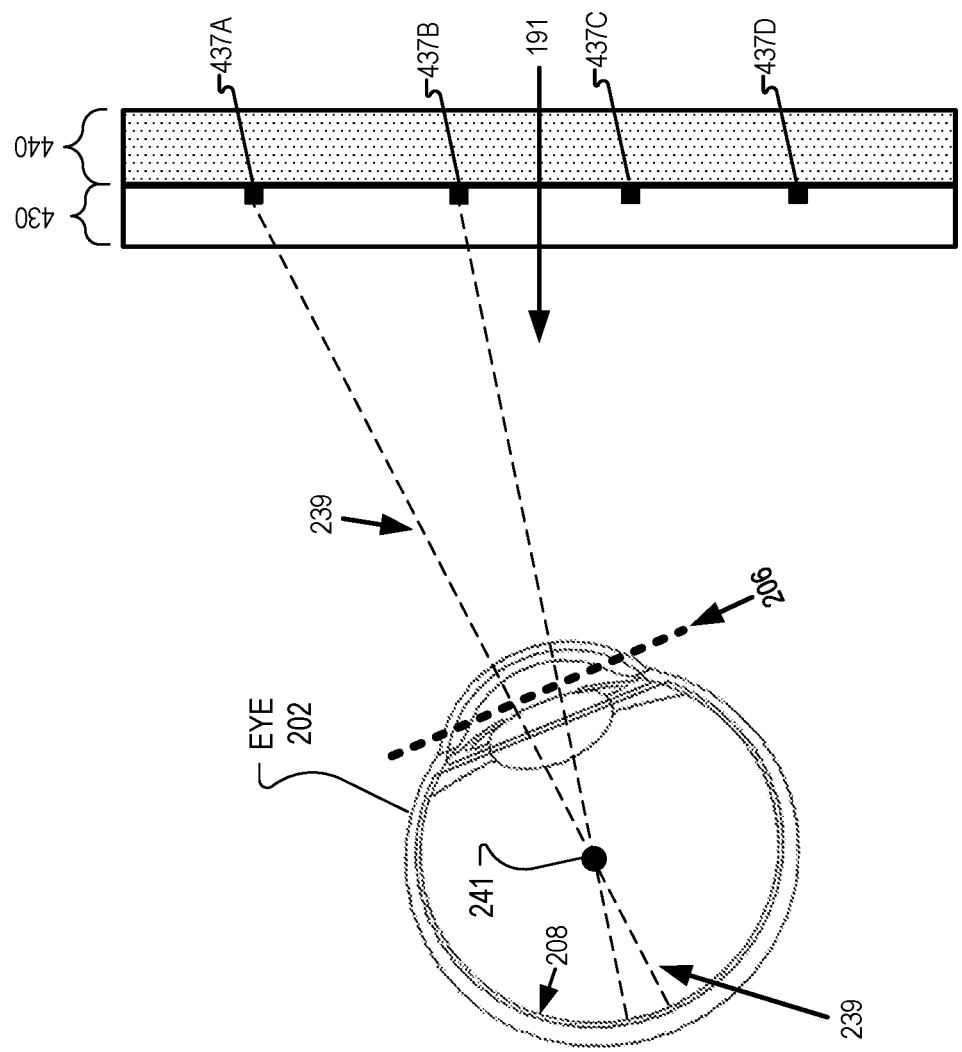
Figure 6C:
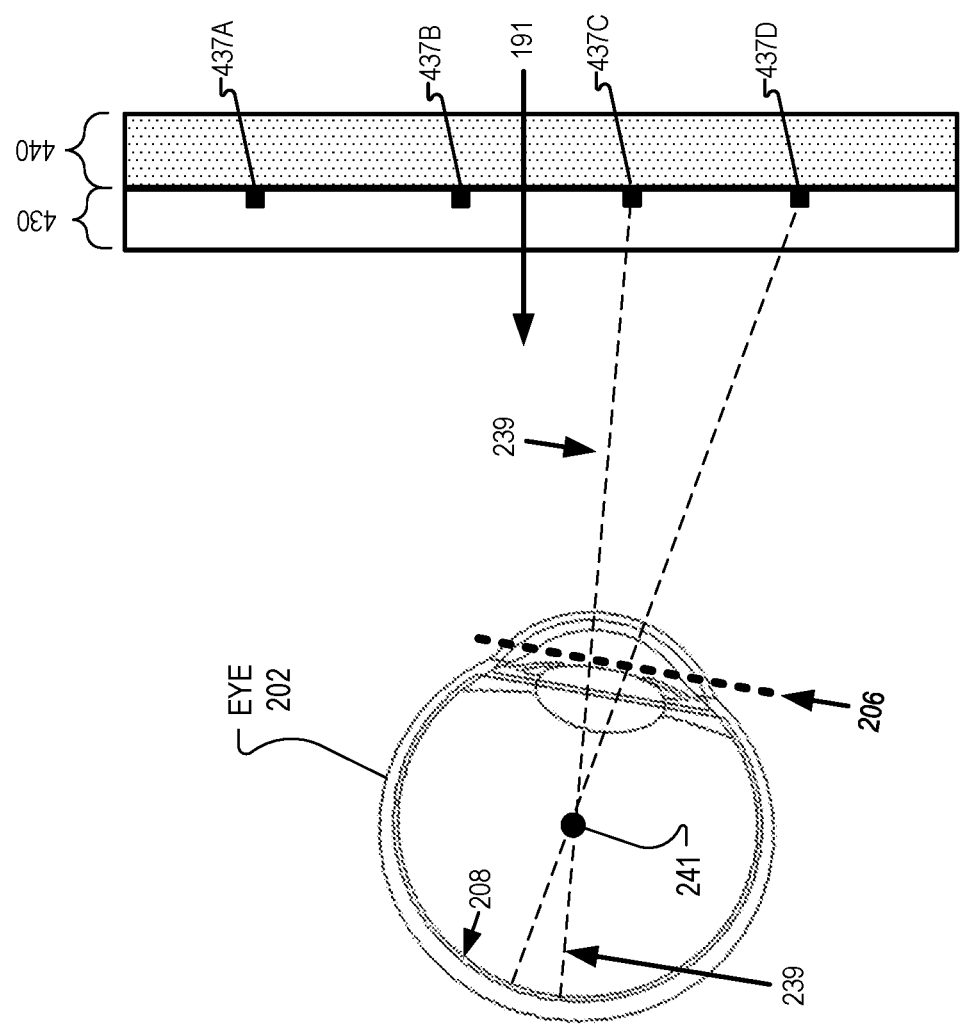

FIGS. 6A-6C illustrates an eye 202 in different positions with respect to an array of infrared in-field illuminators 437 and an example combiner optical element, in accordance with aspects of the disclosure In FIG. 6A, infrared in-field illuminator 437B and 437C emit infrared illumination light 239 to a center of rotation of eye 202. Infrared illumination light 239 may be collimated light. Other infrared in-field illuminators 437 in the array may also emit infrared illumination light 239 to a center of rotation of eye 202. At least a portion of the infrared illumination light 239 propagates through the pupil of eye 202 and reflects off of retina 208 and propagates back through (exiting) the pupil as retina-reflected infrared light.

FIG. 6B illustrates infrared in-field illuminators 437A and 437B emitting infrared illumination light 239 to a center of rotation of eye 202 when eye 202 has changed a gaze angle of the eye. The eye 202 illustrated in FIG. 6B may be gazing up or gazing to the left, for example.

FIG. 6C illustrates infrared in-field illuminators 437C and 437D emitting infrared illumination light 239 to a center of rotation of eye 202 when eye 202 is positioned at yet another gaze angle. The eye 202 illustrated in FIG. 6C may be gazing down or gazing to the right, for example.

Notably, FIGS. 6A-6C illustrate that even when the gaze angle and/or position of eye 202 changes, different infrared in-field illuminators are still able to direct infrared illumination light substantially normal to pupil plane 206 and therefore have the infrared illumination light 239 propagate through the pupil, reflect off of retina 208, propagate back through the pupil (as retina-reflected infrared light 449, not illustrated) to combiner optical element 440 to be redirected to a wavefront sensor. In other words, the infrared in-field illuminators 437 in the array are spaced apart so that at least a portion of the infrared in-field illuminators 437 will be positioned to illuminate a retina of the eye, through a pupil of the eye, with infrared illumination light propagating approximately normal to a pupil plane of the eye, over a range of eye positions. The range of eye positions may include the maximum eye position range that humans are capable of.

In some embodiments, the infrared in-field illuminators 437 in the array are selectively illuminated based on where a given infrared in-field illuminator 437 (or group of infrared in-field illuminators 437) are positioned. The infrared in-field illuminators 437 selected are positioned to illuminate the eye 202 with infrared illumination light 239 that will propagate through the pupil at angle substantially normal to pupil plane 206 so that the combiner optical element 440 can receive a usable signal of retina-reflected infrared light 449 to direct to the wavefront sensor. In some embodiments, the infrared in-field illuminators 437 are selectively activated (turned on) based on eye-tracking data collected by a separate eye-tracking system of an HMD. For example, if the eye-tracking system determines that eye 202 is looking up, infrared in-field illuminators 437A and 437B may be selectively activated since they may be best positioned to illuminate eye 202 with infrared illumination light 239 that will be reflected off retina 208, back through the pupil to combiner optical element 440. Or, if the eye-tracking system determines that eye 202 is looking down, infrared in-field illuminators 437C and 437D may be selectively activated since they may be best positioned to illuminate eye 202 with infrared illumination light 239 that will be reflected off retina 208, back through the pupil to combiner optical element 440.

Figure 7:
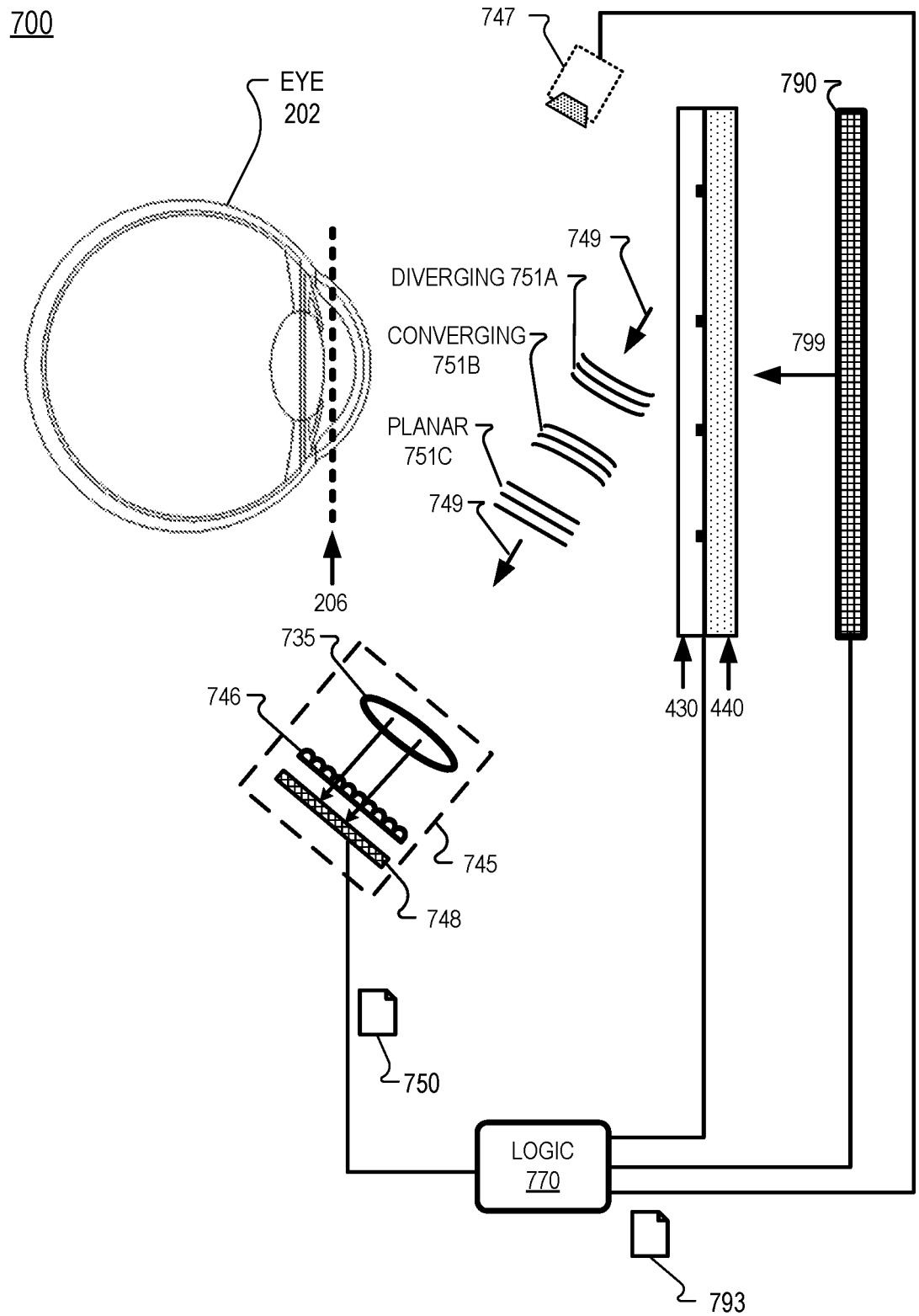
FIG. 7 illustrates a wavefront imaging system that may be utilized in a near-eye optical system, in accordance with aspects of the disclosure.

FIG. 7 illustrates a wavefront imaging system 700 that may be utilized in an HMD or as a near-eye optical system, in accordance with aspects of the disclosure. Wavefront imaging system 700 includes an eye-tracking module 747 for determining a position of eye 202. In some embodiments, eye-tracking module 747 includes a camera configured to capture infrared images of eye 202. Eye-tracking module 747 generates eye-tracking data 793 that may include a position of eye 202. For example, eye 202 may change gaze angles in any combination of up, down, right, and left, and eye-tracking module 747 may provide those gaze angles or eye position in eye-tracking data 793 by analyzing images of eye 202.

Display 790 generates visible display light 799 for presenting a virtual image to a user of an HMD. Visible display light 799 may propagate through a near-eye optical element that includes illumination layer 430 and combiner optical element 440 with very little (if any) optical loss since the materials in the near-eye optical element are configured to pass visible light and combiner 440 may be configured to diffract a particular bandwidth of infrared light emitted by infrared in-field illuminators. Display 790 may include an OLED, micro-LED, or LCD in a virtual reality context. In an augmented reality or mixed reality context, display 790 may include a transparent OLED or an LCOS projector paired with a waveguide included in a near-eye optical element of an HMD, for example.

In FIG. 7, illumination logic 770 is configured to control display 790 and drive images onto display 790. Illumination logic 770 is also configured to receive eye-tracking data 793 generated by eye-tracking module 747. Optionally, illumination logic 770 is configured to selectively activate (turn on) individual or groups of infrared in-field illuminators in an array of infrared in-field illuminators in illumination layer 430. Illumination logic 770 may selectively activate the infrared in-field illuminators based on the received eye-tracking data 793.

FIG. 7 shows that retina-reflected infrared light 749 may include a diverging wavefront 751A, a converging wavefront 751B, or a planar wavefront 751C. The wavefront is directed to wavefront sensor 745 via combiner optical element 440 so that wavefront sensor 745 can capture a wavefront image 750 that may be provided to illumination logic 770. Although the optical paths associated with infrared illumination light 239/439 are not illustrated in FIG. 7, the infrared illumination light generally follows the example optical paths illustrated in FIG. 4.

Example wavefront sensor 745 includes an image sensor 748, a lenslet array 746, and an optional focusing lens 735. Wavefront sensor 745 may be arranged as a Shack-Hartmann wavefront sensor. Image sensor 748 may be included in a camera with additional focusing elements. Image sensor 748 may include a complementary metal-oxide semiconductor (CMOS) image sensor, for example. As described previously, the camera may include an infrared filter configured to pass the wavelengths of the retina-reflected infrared light and reject other light wavelengths. The lenslet array 746 is disposed in an optical path between the combiner optical element 440 and image sensor 748, in FIG. 7. Lenslet array 746 may be positioned at a plane that is conjugate to a pupil plane 206 of eye 202. Although not illustrated, additional optical elements (e.g. mirrors and/or lenses) may be included to properly focus the retina-reflected infrared light 749 to wavefront sensor 745, in different arrangements.

Illumination logic 770 may be configured to adjust a virtual image presented to the eye 202 of a user in response to determining an accommodative eye state value based on a wavefront image 750 captured by wavefront sensor 745. Since the accommodative state of the eye can be derived from wavefront image 750, a user's refractive error can be measured and corrected for. Display images driven onto display 790 may be tailored to correct for the user's refractive error.

Figure 8:
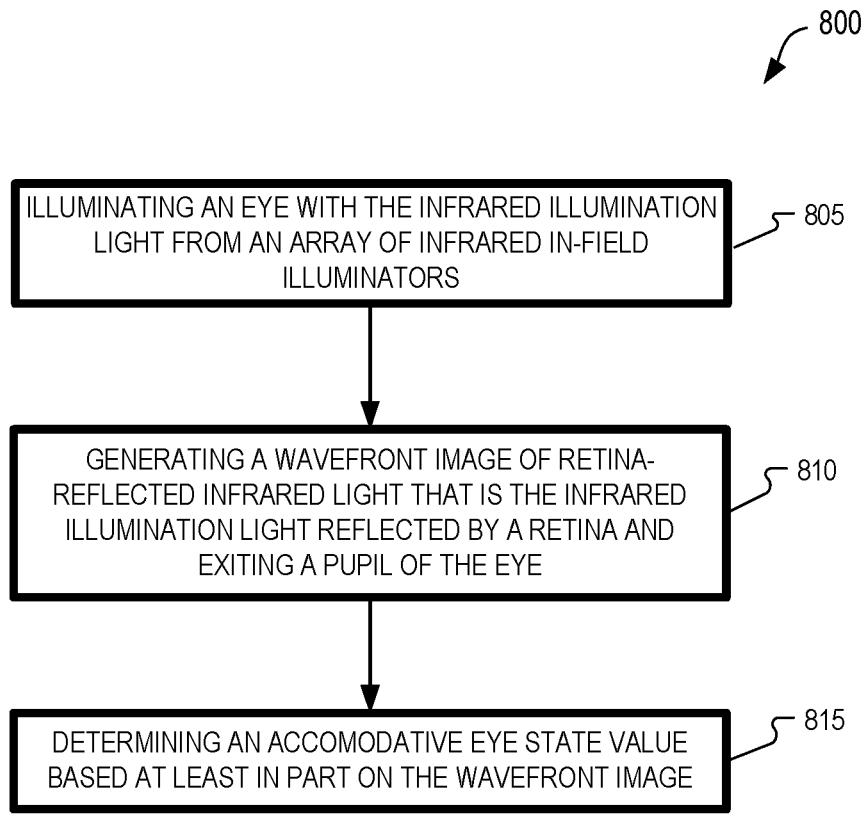
FIG. 8 illustrates a flow chart for generating an accommodative eye state value, in accordance with aspects of the disclosure.

FIG. 8 illustrates a flow chart for generating an accommodative eye state value, in accordance with aspects of the disclosure. The order in which some or all of the process blocks appear in process 800 should not be deemed limiting. Rather, one of ordinary skill in the art having the benefit of the present disclosure will understand that some of the process blocks may be executed in a variety of orders not illustrated, or even in parallel. Process 800 may be executed by illumination logic 770, for example.

In process block 805, an eye is illuminated by infrared illumination light (e.g. infrared illumination light 239) from an array of infrared in-field illuminators where the infrared illumination light from each infrared in-field illuminator is directed to a center of rotation of the eye. The infrared illumination light may be collimated or near-collimated.

In process block 810, a wavefront image (e.g. 750) of retina-reflected infrared light (e.g. 649) is generated. The retina-reflected infrared light is the infrared illumination light (e.g. 639) reflected by a retina and exiting a pupil of the eye. In some embodiments, generating the wavefront image includes receiving the retina-reflected infrared light with a wavefront sensor (e.g. 745) including an image sensor and a lenslet array. The lenslet array may be positioned in a plane that is conjugate to a pupil plane of the eye.

In process block 815, an accommodative eye state value is determined based at least in part on the wavefront image. In some embodiments, determining the accommodative eye state value includes analyzing a spacing of beam spots of the wavefront image generated by microlenses of the lenslet array focusing the retina-reflected infrared light onto the image sensor.

In an embodiment, process 800 further includes adjusting a virtual image presented to the eye by a head mounted display in response to determining the accommodative eye state value.

Figure 9:
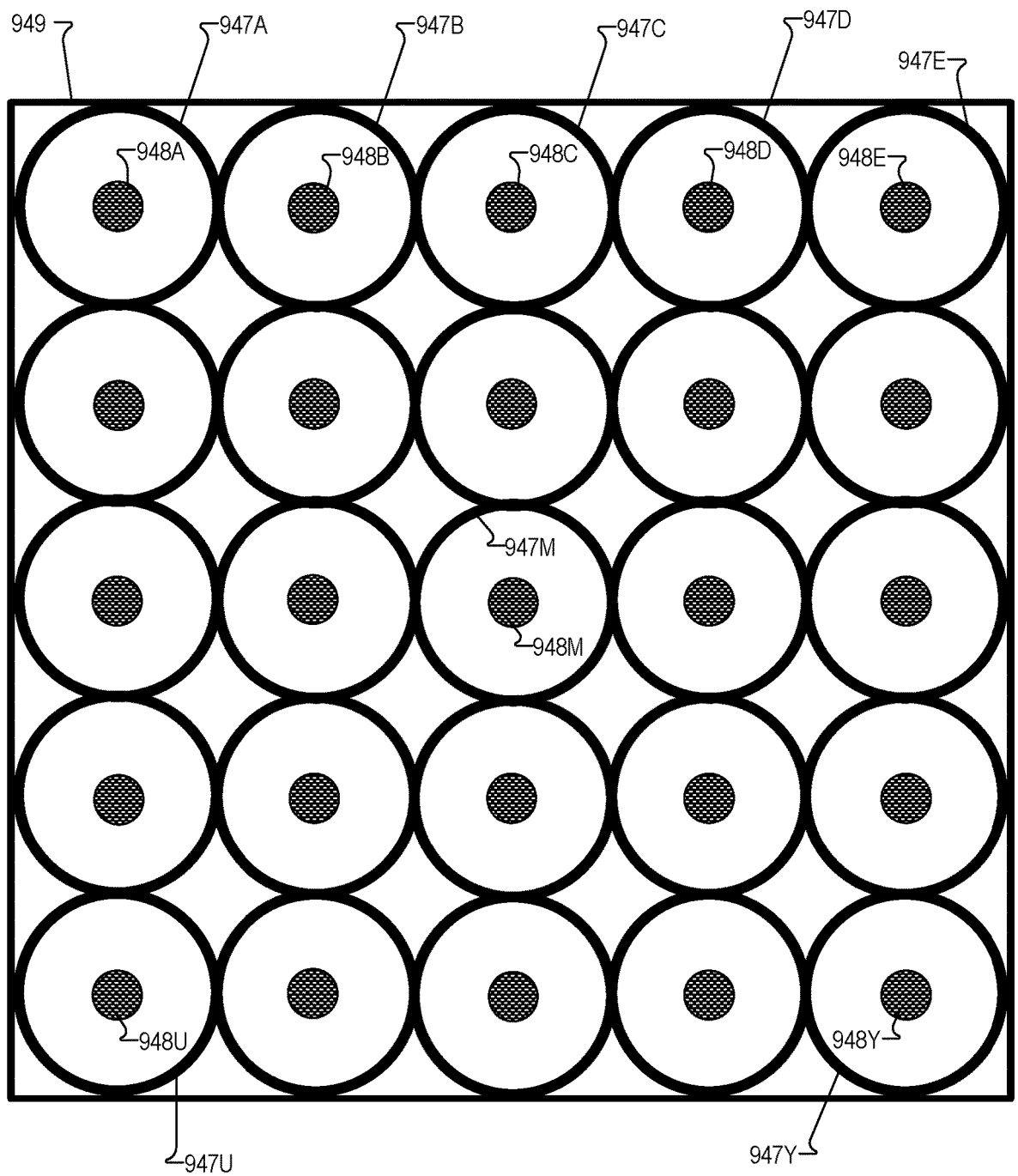
FIG. 9 is a block diagram illustration of a lenslet array focusing a planar wavefront of retina-reflected infrared light onto an image sensor as beam spots, in accordance with aspects of the disclosure.

FIG. 9 illustrates a block diagram illustration of a lenslet array 947 focusing a planar wavefront of retina-reflected infrared light 649 onto an image sensor 949 as beam spots 948, in accordance with aspects of the disclosure. In the illustrated block diagram example, lenslet array 947 includes a plurality of microlenses 947A-947Y that focus corresponding beam spots 948A-948Y. For example, microlens 947A focuses infrared light onto image sensor 949 as beam spot 948A, microlens 947B focuses infrared light onto image sensor 949 as beam spot 948B . . . and microlens 947Y focuses infrared light onto image sensor 949 as beam spot 948Y. Microlens 947M is the middle microlens in the example 5×5 array of microlenses in lenslet array 947. FIG. 9 illustrates that when retina-reflected infrared light 649 is a planar wavefront (e.g. wavefront 751C), each beam spot 948 is axially aligned with an optical axis of its corresponding microlens that focuses that particular beam spot 948. Accordingly, each beam spot 948 in the example is equidistant. In other examples, beam spots 948 may not necessarily be equidistance for incoming planar wavefronts.

Figure 10:
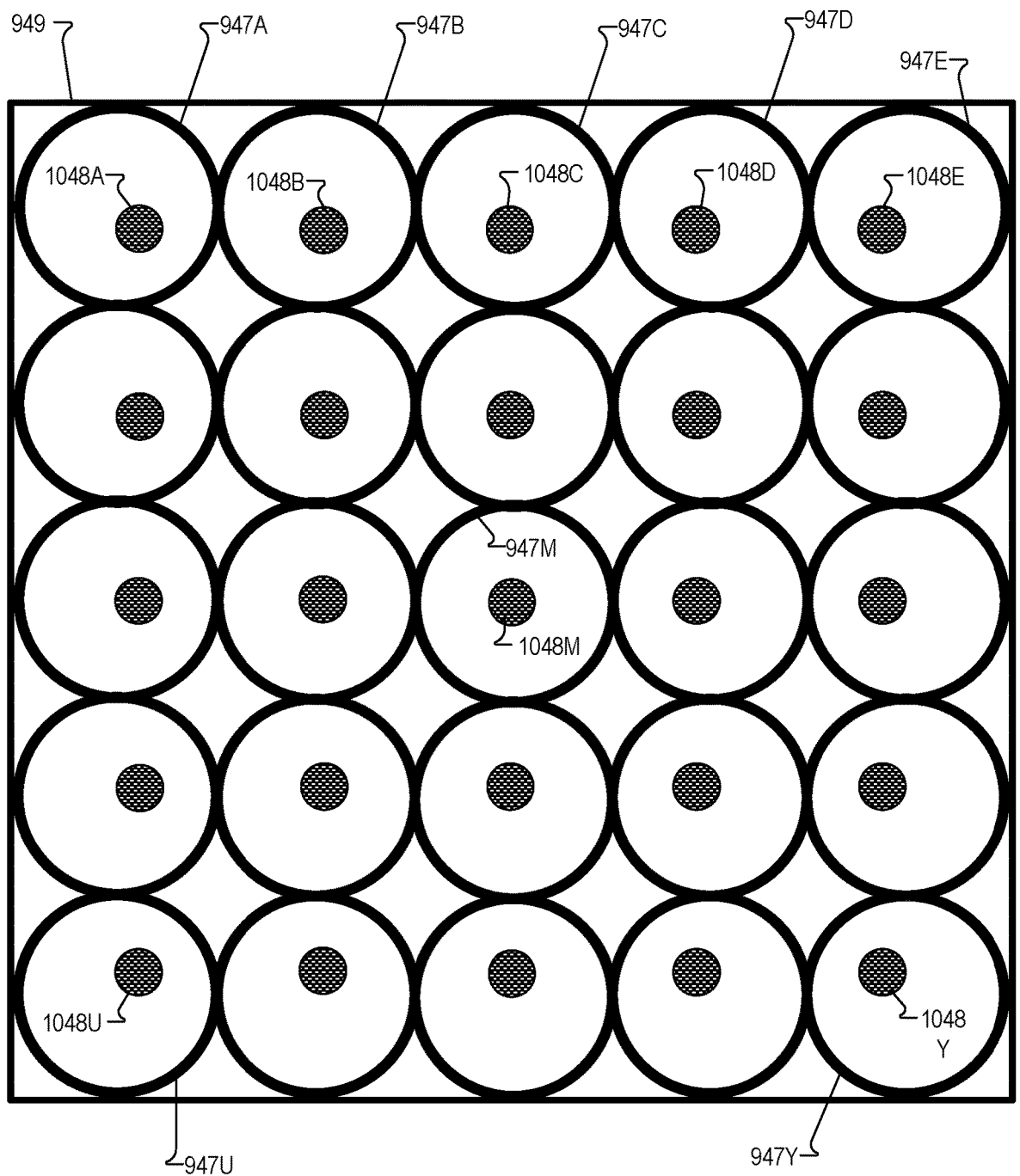
FIG. 10 is a block diagram illustration of a lenslet array focusing a converging wavefront of reflected infrared light onto an image sensor as beam spots, in accordance with aspects of the disclosure.

FIG. 10 illustrates a block diagram illustration of a lenslet array 947 focusing a converging wavefront of retina-reflected infrared light 649 onto an image sensor 949 as beam spots 1048, in accordance with an embodiment of the disclosure. FIG. 10 illustrates that when retina-reflected infrared light 649 is a converging wavefront (e.g. wavefront 751B), beam spots 1048 have converged toward middle beam spot 1048M. Accordingly, when the beam spots 1048 are converging, a wavefront image that captures beam spots 1048 will indicate that the lens system of eye 202 is focusing at nearer distances. The closer the beam spots 1048 converge, the nearer the distance the eye 202 may be focusing to.

Figure 11:
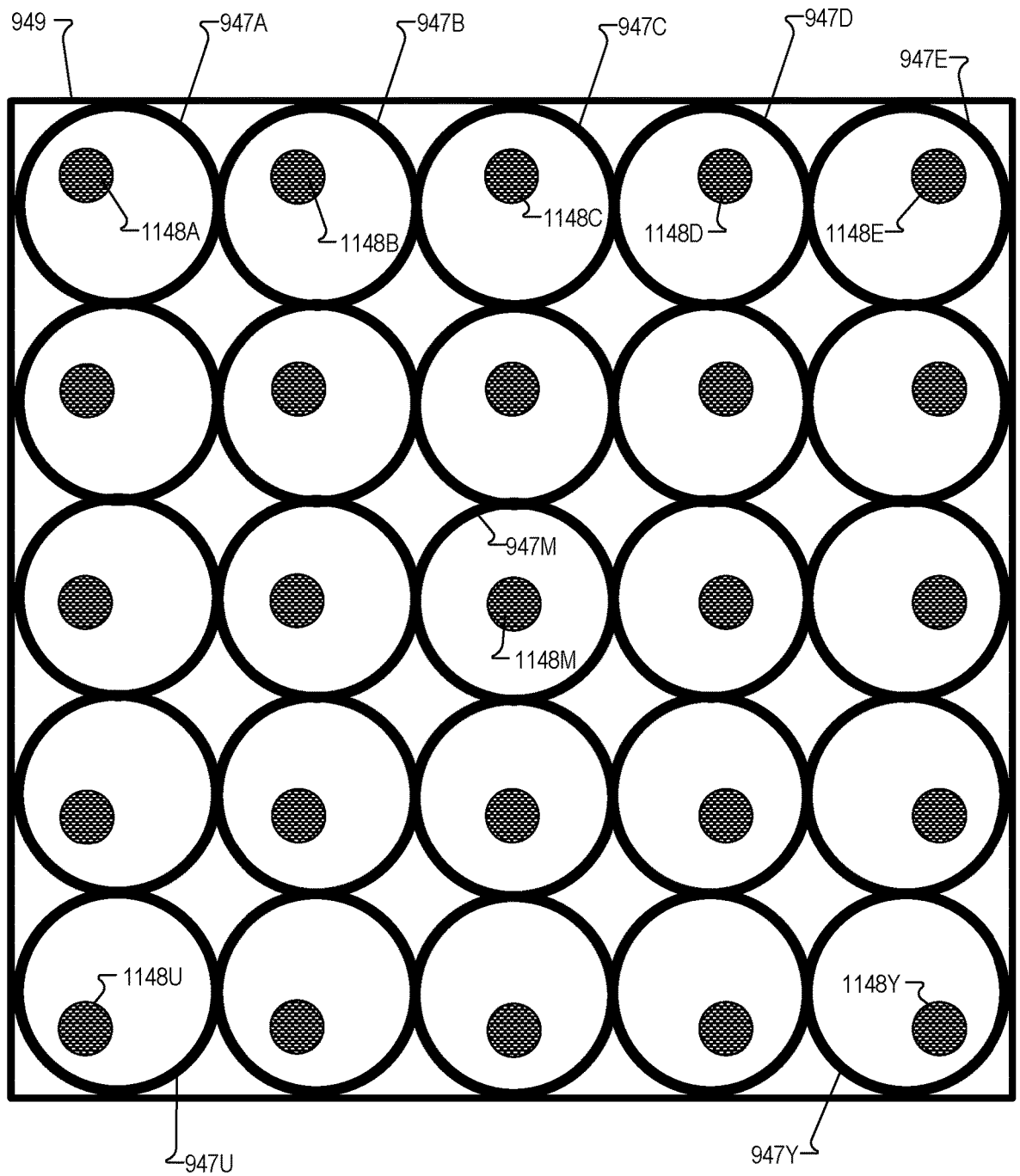
FIG. 11 is a block diagram illustration of a lenslet array focusing a diverging wavefront of reflected infrared light onto an image sensor as beam spots, in accordance with aspects of the disclosure.

FIG. 11 illustrates a block diagram illustration of a lenslet array 947 focusing a diverging wavefront of retina-reflected infrared light 649 onto an image sensor 949 as beam spots 1148, in accordance with an embodiment of the disclosure. FIG. 11 illustrates that when retina-reflected infrared light 649 is a diverging wavefront (e.g. wavefront 751A), beam spots 1148 have diverged away from middle beam spot 1148M. Accordingly, when the beam spots 1148 are diverging, a wavefront image that captures beam spots 1148 will indicate that eye 202 is focusing at a farther distance. In some cases, wavefront 751A is not diverging but merely less divergent than wavefront 751C and the beam spots 1148 formed on the wavefront image are also not converging, but rather converging less than beam spots 1048 of FIG. 10. In this case, the lesser extent of the convergence of beam spots 1148 (compared with the convergence of beam spots 1048) indicates that the eye 202 is focusing at a farther distance than the more condensed beam spots 1048. Consequently, a greater condensing of the beam spots from the respective microlenses represents a near-focused accommodative eye state value where the eye is focused at a near distance and a lesser condensing of the beam spots from the respective microlenses represents a far-focused accommodative eye state value where the eye is focused at a farther distance.

Although lenslet array 947 or 746 may not be configured exactly as illustrated in FIGS. 9-11 in all implementations, FIGS. 9-11 illustrate how analysis of the positioning of the beam spots will indicate the diverging or converging nature of the wavefront of retina-reflected infrared light 649 as well as the magnitude of the divergence or convergence. Accordingly, a magnitude and nature of the accommodative state of the lens system of eye 202 may be determined from a wavefront image generated by wavefront sensor 745 by analyzing the spacing of the beam spots.

An algorithm to determine the accommodative eye state value of an eye may include detecting bright beam spots with sub-pixel resolution accuracy. The pupil of the eye may be segmented based on intensity thresholding or other computer vision or machine learning principles. Of course, distortion of any optics in the optical path between the optical combiner element and the wavefront sensor may be accounted for. The raw data from a wavefront image that includes an array of bright spots over a dark background may be converted to a wavefront map and compared to a calibration metric to determine an offset in a spherical curvature of an incoming wavefront, for example.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "illumination logic" or "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A head mounted display (HMD) comprising:
   a wavefront sensor;
   an illumination layer configured to emit infrared illumination light that is collimated or near-collimated to a center of rotation of an eye; and
   an optical element configured to receive retina-reflected infrared light and redirect the retina-reflected infrared light to the wavefront sensor, wherein the retina-reflected infrared light is the infrared illumination light reflected by a retina and exiting a pupil of the eye, and wherein the wavefront sensor is configured to generate a wavefront image in response to the retina-reflected infrared light.

2. The HMD of claim 1, wherein the illumination layer includes an array of infrared in-field illuminators configured to be disposed between 10 mm and 35 mm from the eye when a user of the HMD is utilizing the HMD, and wherein the array of infrared in-field illuminators is visually unnoticeable by the eye when disposed between 10 and 35 mm from the eye.

3. The HMD of claim 2, wherein an individual infrared in-field illuminator has a footprint of less than 200 microns× 200 microns.

4. A near-eye optical system comprising:
a wavefront sensor;
an array of infrared in-field illuminators configured to emit infrared illumination light to a center of rotation of an eye; and
a combiner optical element configured to receive retina-reflected infrared light and redirect the retina-reflected infrared light to the wavefront sensor, wherein the retina-reflected infrared light is the infrared illumination light reflected by a retina and exiting a pupil of the eye, and wherein the wavefront sensor is configured to generate a wavefront image in response to the retina-reflected infrared light.

5. The near-eye optical system of claim 4, wherein each of the infrared in-field illuminators in the array includes:
an infrared light source emitting the infrared illumination light; and
a beam-forming element configured to direct the infrared illumination light toward the center of rotation of the eye.

6. The near-eye optical system of claim 5, wherein the beam-forming elements of the infrared light sources are configured to increase an illumination angle of the infrared illumination light as a distance of a particular beam-forming element increases from a middle region of the array of infrared in-field illuminators.

7. The near-eye optical system of claim 4, wherein the infrared in-field illuminators include at least one of a micro light emitting diode (micro-LED), an edge emitting LED, a vertical cavity surface emitting laser (VCSEL) diode, or a Superluminescent diode (SLED).

8. The near-eye optical system of claim 4 further comprising:
a transparent substrate, wherein the array of infrared in-field illuminators is disposed on the transparent substrate, and wherein the transparent substrate is positioned to pass the retina-reflected infrared light through the transparent substrate to the combiner optical element, the combiner optical element configured to redirect the retina-reflected infrared light back through the transparent substrate toward the wavefront sensor.

9. The near-eye optical system of claim 4 further comprising:
illumination logic configured to selectively activate individual infrared in-field illuminators in the array of infrared in-field illuminators.

10. The near-eye optical system of claim 4, wherein the wavefront sensor includes:
a camera including an image sensor; and
a lenslet array disposed in an optical path between the combiner optical element and the image sensor, wherein microlenses of the lenslet array focus the retina-reflected infrared light onto the image sensor.

11. The near-eye optical system of claim 10, wherein the lenslet array is positioned at a plane that is conjugate to a pupil plane of an eye.

12. The near-eye optical system of claim 10, wherein the camera includes an infrared filter configured to pass the infrared illumination light and reject other light wavelengths.

13. The near-eye optical system of claim 4, wherein the combiner optical element includes a polarization-selective volume hologram that reflects a first polarization orientation of the retina-reflected infrared light and passes polarization orientations that are other than the first polarization orientation, and wherein the combiner optical element passes visible light.

14. The near-eye optical system of claim 4, wherein the infrared in-field illuminators in the array are spaced apart so that at least a portion of the infrared in-field illuminators will be positioned to illuminate a retina of the eye, through a pupil of the eye, over a range of eye positions.

15. A method comprising:
illuminating an eye with infrared illumination light, wherein the infrared illumination light is directed to a center of rotation of the eye;
generating a wavefront image of retina-reflected infrared light, wherein the retina-reflected infrared light is the infrared illumination light reflected by a retina and exiting a pupil of the eye; and
determining an accommodative eye state value based at least in part on the wavefront image.

16. The method of claim 15, wherein generating the wavefront image includes receiving the retina-reflected infrared light with a wavefront sensor including an image sensor and a lenslet array.

17. The method of claim 16, wherein the lenslet array is positioned at a plane that is conjugate to a pupil plane of the eye.

18. The method of claim 16, wherein determining the accommodative eye state value includes analyzing a spacing of beam spots of the wavefront image generated by microlenses of the lenslet array focusing the retina-reflected infrared light onto the image sensor.

19. The method of claim 15 further comprising:
adjusting a virtual image presented to the eye by a head mounted display in response to the accommodative eye state value.

20. The method of claim 15, wherein the infrared illumination light is collimated or near-collimated.

* * * * *